(12) United States Patent
Boywitt et al.

(10) Patent No.: US 8,814,260 B2
(45) Date of Patent: Aug. 26, 2014

(54) WIND DEFLECTOR

(71) Applicant: GM Gobal Technology Operations LLC, Detroit, MI (US)

(72) Inventors: Axel Boywitt, Weiterstadt (DE); Ingo Fettel, Hainburg (DE); Manfred Tines, Ruesselsheim (DE); Klaus-Dieter Kramer, Hofheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/717,534

(22) Filed: Dec. 17, 2012

(65) Prior Publication Data

US 2013/0175830 A1  Jul. 11, 2013

(30) Foreign Application Priority Data

Dec. 17, 2011  (DE) .......................... 10 2011 121 402

(51) Int. Cl.
*B60J 7/043* (2006.01)
(52) U.S. Cl.
USPC ....................................................... 296/217
(58) Field of Classification Search
USPC ........................................................ 296/217
See application file for complete search history.

(56) References Cited

U.S. PATENT DOCUMENTS

| 5,178,436 | A  | * | 1/1993 | Eberius et al. | ................ 296/217 |
| 6,666,503 | B1 | * | 12/2003 | Sorensen | ...................... 296/217 |
| 6,705,673 | B1 |   | 3/2004 | Sorensen et al. | |
| 7,152,917 | B2 |   | 12/2006 | Manders | |
| 7,837,258 | B2 |   | 11/2010 | Bergmiller | |
| 2003/0168892 | A1 | * | 9/2003 | Bohm et al. | .................. 296/217 |
| 2004/0041445 | A1 |   | 3/2004 | Cooney et al. | |

FOREIGN PATENT DOCUMENTS

| DE |  19518696 A1 | 11/1996 |
| DE |  19734249 A1 | 2/1999 |
| DE | 102004052715 A1 | 5/2006 |
| DE | 102006012644 A1 | 7/2007 |

OTHER PUBLICATIONS

German Patent Office, Search Report for German Application No. 102011121402.3, dated Jul. 17, 2012.

* cited by examiner

*Primary Examiner* — Lori Lyjak
(74) *Attorney, Agent, or Firm* — Ingrassia Fisher & Lorenz, P.C.

(57) ABSTRACT

A wind deflector for an overflowable opening in a wall element of a motor vehicle, which can be moved from a basic position exposed at least nearly to no flow into an operating position exposed to a flow, is provided. The wind deflector includes a movable first clamping arm that protrudes over the wall element in the operating position exposed to a flow, and a movable second clamping arm. The wind deflector includes an extensive wind deflector arranged between the first clamping arm and second clamping arm, wherein the second clamping arm and/or the wind deflector at least nearly abuts against an edge of the overflowable opening in the operating position.

16 Claims, 2 Drawing Sheets

WIND DEFLECTOR

CROSS-REFERENCE TO RELATED APPLICATION

This application claims priority to German Patent Application No. 10 2011 121 402.3, filed Dec. 17, 2011, which is incorporated herein by reference in its entirety.

TECHNICAL FIELD

The technical field relates to a wind deflector for an overflowable opening in a wall element of a motor vehicle, as well as to a motor vehicle with such a wind deflector.

BACKGROUND

Wind deflectors are known in motor vehicles with sunroofs. Wind deflectors are arranged inside the vehicle with the sunroof in the closed state, and protrude at least partially over the vehicle roof with the sunroof in the open state. The wind deflector is here in its operating position, in which it deflects or diverts the airstream.

Known from DE 195 18 696 A1 is a wind deflector, in which a first strip of the wind deflector is moved upward, while a second strip is fixed in place on a roof opening. Situated between the two strips is a wind deflecting means, which is exposed to the airstream in the operating position.

In known wind deflectors, it has been proven disadvantageous that the lower, second strip is spaced apart from the edge of the sunroof in the operating position of the wind deflector, and that the wind deflecting means can sag when exposed to the airstream. The resultant gap leads to wind and humming noises, which are perceived as bothersome, in particular at high speeds.

Therefore it may be desirable to provide a wind deflector in which the wind and humming noises are reduced. In addition, other objects, desirable features and characteristics will become apparent from the subsequent summary and detailed description, and the appended claims, taken in conjunction with the accompanying drawings and this background.

SUMMARY

According to various aspects of the present disclosure provided is a wind deflector for an overflowable opening in a wall element of a motor vehicle, which can be moved from a basic position exposed at least nearly to no flow into an operating position exposed to a flow, with a movable first clamping arm that protrudes over the wall element in the operating position exposed to a flow, with a movable second clamping arm, and with an in one example, extensive wind deflecting means arranged between the first clamping arm and second clamping arm, wherein the second clamping arm and/or the wind deflecting means at least nearly abut(s) against an edge of the overflowable opening in the operating position.

The opening of the wall element can encompass a sunroof opening. In one example, an airstream can flow over the latter. It is further conceivable for wind to flow around the latter even with the motor vehicle stationary.

The wind deflecting means can be rigid or flexible. It can further be elastically deformable in design. The wind deflecting means is generally braced at least in the operating position.

In particular, movable is understood to involve a movement relative to the motor vehicle.

Because the second clamping arm and/or wind deflecting means are arranged at least nearly on the edge of the opening in the operating position, a gap between the second clamping arm and the edge or the wind deflecting means and the edge is reduced, as a result of which the wind and humming noises are also reduced.

The first clamping arm, second clamping arm and edge of the overflowable opening can basically be extended in any direction desired. For example, it can be arranged on the side of the motor vehicle, and the overflowable opening can encompass a window of the motor vehicle. If the overflowable opening encompasses a sunroof, it is advantageous for the edge of the overflowable opening and/or the first clamping arm and/or the second clamping arm to run transverse or inclined relative to the longitudinal direction of the motor vehicle.

In such a case, the wind deflector is exposed to an substantially transverse or inclined flow enveloping the motor vehicle.

One exemplary embodiment of the wind deflector according to the present disclosure can provide that the first clamping arm encompass a movement out of the opening of the wall element when the wind deflector is moved from the basic position into the operating position, and/or wherein the second clamping arm is spaced apart from the edge in the basic position, and encompasses a movement toward the edge or away from the edge when the wind deflector is moved from the basic position into the operating position.

For example, it is best that the second clamping arm be moved toward the edge when it at least nearly abuts against the edge in the operating position.

If the wind deflecting means at least nearly abuts against the edge in the operating position, it proves advantageous for the second clamping arm to be moved away from the edge, in particular toward the front of the vehicle. In such a case, the first clamping arm is arranged on the rear side of the vehicle relative to the edge, and the second clamping arm on the front side of the vehicle.

In another exemplary embodiment of the present disclosure, it proves advantageous for the wind deflecting means to be braced by the movements of the first clamping arm and second clamping arm.

In order to further reduce the wind and humming noises, it proves advantageous for the second clamping arm and/or the wind deflecting means to abut against the edge in the operating position.

The first clamping arm and second clamping arm can comprise any material desired, in one example, a plastic. It proves advantageous for at least a side of the second clamping arm facing the edge to encompass an elastic sealing material, with which the second clamping arm abuts against the edge in the operating position. In such a case, the sealing material can seal any gap, thereby further reducing wind and humming noises.

It is basically conceivable for the first clamping arm and/or second clamping arm to extend only over a section of the edge. Further, several first clamping arms and several second clamping arms can be provided, which brace a wind deflecting means or several wind deflecting means.

An exemplary embodiment provides that the first clamping arm and/or second clamping arm be designed like strips, in one example, each encompass a clamping strip that extends at least nearly over the width of the edge.

The wind deflecting means can be braced and/or retained by the first clamping arm and second clamping arm. It is further conceivable that a clamping device be formed in the first clamping arm and/or second clamping arm, with which the wind deflecting means can be braced and/or wherein the wind deflecting means can be adjusted by setting the distance between the first clamping arm and second clamping arm.

The wind deflecting means can be flexibly bendable or rigid in design. In addition, the wind deflecting means can encompass at least one at least partially air-permeable section.

Further, several air-permeable sections can be provided. The air-permeable section can be formed by continuous openings in a fabric or a rigid, plate-like body.

In another exemplary embodiment of the present disclosure, it is best that the at least one at least partially air-permeable section encompass a mesh.

In addition, it proves advantageous if the wind deflector can be manually or automatically moved into the operating position.

Finally, an exemplary embodiment provides that the wind deflector encompass a mesh wind deflector.

In addition, another exemplary aspect of the present disclosure provides a motor vehicle having a wind deflector, in particular with one of the aforementioned features.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
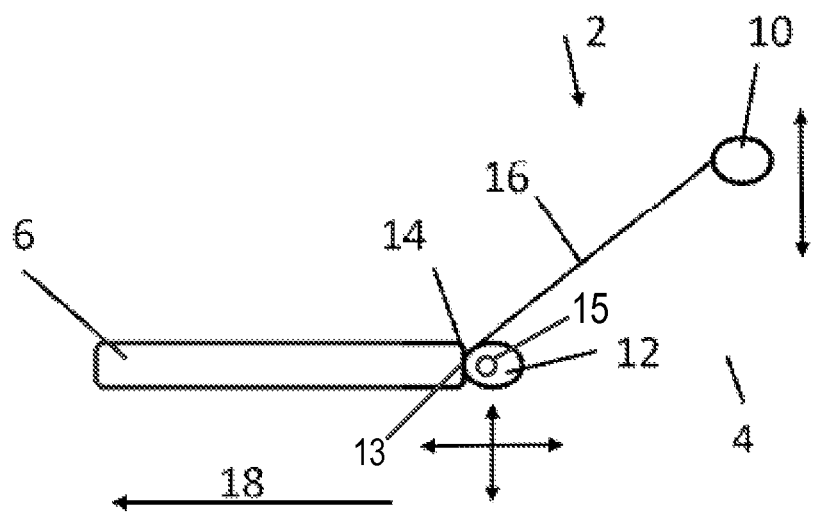
FIG. 1 shows a schematic side view of an exemplary embodiment of the wind deflector according to the present disclosure.

The following detailed description is merely exemplary in nature and is not intended to limit the present disclosure or the application and uses of the present disclosure. Furthermore, there is no intention to be bound by any theory presented in the preceding background or the following detailed description.

The figures show a wind deflector marked 2 overall. The wind deflector 2 is arranged on an opening 4 of a wall element 6 of a motor vehicle 8 over which wind, in particular an airstream, can flow.

In the figures, the wind deflector 2 is shown in an operating position exposed to a flow, in which a movable first clamping arm 10 protrudes out of the opening 4 over the wall element 6. In the exemplary embodiment depicted on FIG. 1, a second movable clamping arm 12 abuts against an edge 14 of the opening 4 of the wall element 6.

The edge of the overflowable opening 4, as well as the first clamping arm 10 and second clamping arm 14, run transverse to the longitudinal direction of the motor vehicle 18 of the motor vehicle 8.

Situated between the first clamping arm 10 and second clamping arm 12 is an extensive wind deflecting means 16, which is braced and/or retained by the first clamping arm 10 and second clamping arm 12. In one example, the wind deflecting means 16 is braced by moving the first clamping arm 10 and second clamping arm 12.

In another example, a clamping device 15 be formed in the first clamping arm and/or second clamping arm, with which the wind deflecting means can be braced and/or wherein the wind deflecting means can be adjusted by setting the distance between the first clamping arm and second clamping arm.

In the exemplary embodiment visible on FIG. 1, the second clamping arm 12 abuts against the edge 14 of the opening 4. This at least reduces a gap between the edge 14 and second clamping arm 12, thereby preventing or at least reducing wind and humming noises. At least a side of the second clamping arm facing the edge encompasses an elastic sealing material 13, with which the second clamping arm abuts against the edge in the operating position. In such a case, the sealing material 13 can seal any gap, thereby further reducing wind and humming noises.

Figure 2:
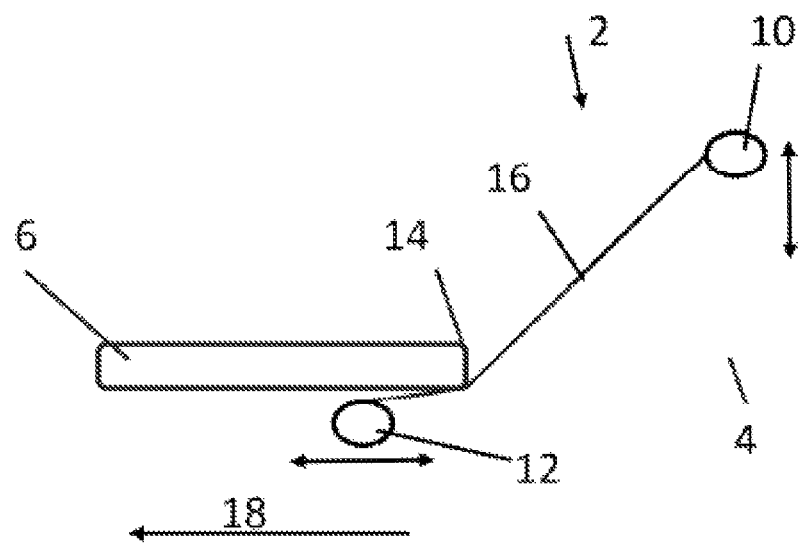
FIG. 2 shows a schematic side view of another exemplary embodiment of the wind deflector according to the present disclosure.

FIG. 2 shows an exemplary embodiment in which the second clamping arm 12 is situated on the front side of the vehicle relative to the edge 14, and the first clamping arm 10 is situated on the rear side of the vehicle relative to the edge 14. In such a case, the wind deflecting means 16 abuts against the edge 14 in the operating position.

Figure 3:
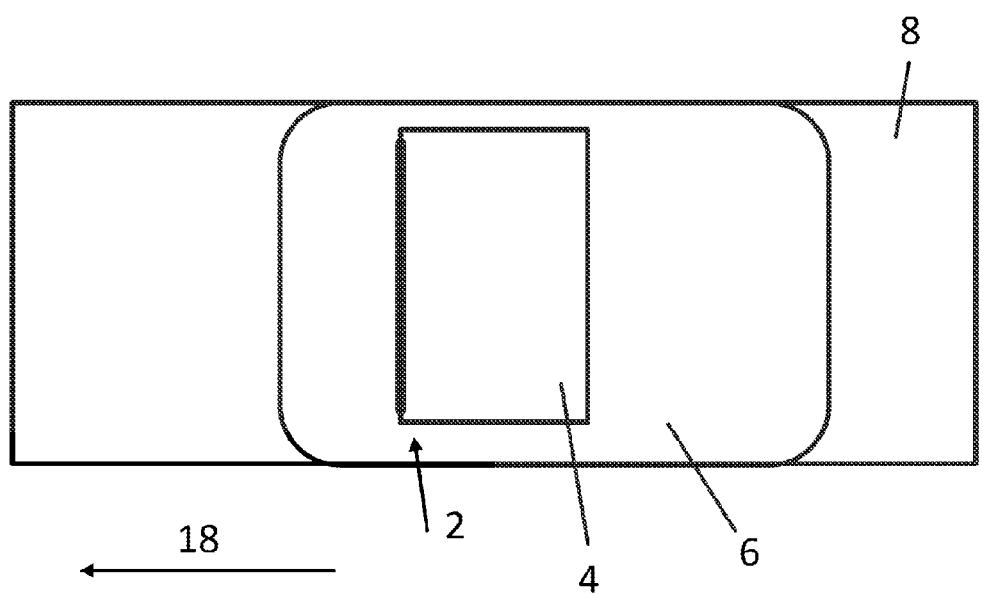
FIG. 3 shows a schematic top view of the exemplary embodiment according to FIG. 1.

FIG. 3 shows a top view of the exemplary embodiment according to FIG. 1. The first clamping arm 10 and second clamping arm 12 are designed like strips, and extend over the width of the edge 14.

The wind deflecting means 16 encompasses an at least partially air-permeable section (not visible on the figures), which is formed by a mesh.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A wind deflector for an overflowable opening in a wall element of a motor vehicle, which is movable from a basic position exposed at least nearly to no flow into an operating position exposed to a flow, the wind deflector comprising:
   a movable first clamping arm that protrudes over the wall element in the operating position exposed to a flow;
   a movable second clamping arm; and
   an extensive wind deflecting means arranged between the first clamping arm and the second clamping arm,
   wherein at least one of the second clamping arm and the wind deflecting means abuts against an edge of the overflowable opening in the operating position, and
   wherein at least a side of the second clamping arm facing the edge further comprises an elastic sealing material, with which the second clamping arm abuts against the edge in the operating position.

2. The wind deflector according to claim 1, wherein at least one of the edge of the overflowable opening, the first clamping arm and the second clamping arm run transverse or inclined relative to the longitudinal direction of the motor vehicle.

3. The wind deflector according to claim 1, wherein the first clamping arm moves out of the opening of the wall element when the wind deflector moves from the basic position into the operating position.

4. The wind deflector according to claim 1, wherein the second clamping arm is spaced apart from the edge in the basic position, and moves toward the edge or away from the edge when the wind deflector moves from the basic position into the operating position.

5. The wind deflector according to claim 3, wherein the wind deflecting means is braced by the movements of the first clamping arm and the second clamping arm.

6. The wind deflector according to claim 1, wherein at least one of the first clamping arm and the second clamping arm are designed like strips.

7. A wind deflector for an overflowable opening in a wall element of a motor vehicle, which is movable from a basic position exposed at least nearly to no flow into an operating position exposed to a flow, the wind deflector comprising:
a movable first clamping arm that protrudes over the wall element in the operating position exposed to a flow;
a movable second clamping arm; and
an extensive wind deflecting means arranged between the first clamping arm and the second clamping arm,
wherein at least one of the second clamping arm and the wind deflecting means at least nearly abuts against an edge of the overflowable opening in the operating position, and
wherein the first clamping arm and the second clamping arm each are a clamping strip that extends at least nearly over the width of the edge.

8. A wind deflector for an overflowable opening in a wall element of a motor vehicle, which is movable from a basic position exposed at least nearly to no flow into an operating position exposed to a flow, the wind deflector comprising:
a movable first clamping arm that protrudes over the wall element in the operating position exposed to a flow;
a movable second clamping arm; and
an extensive wind deflecting means arranged between the first clamping arm and the second clamping arm,
wherein at least one of the second clamping arm and the wind deflecting means at least nearly abuts against an edge of the overflowable opening in the operating position, and wherein a clamping device is formed in at least one of the first clamping arm and the second clamping arm, with which the wind deflecting means is braceable.

9. A wind deflector for an overflowable opening in a wall element of a motor vehicle, which is movable from a basic position exposed at least nearly to no flow into an operating position exposed to a flow, the wind deflector comprising:
a movable first clamping arm that protrudes over the wall element in the operating position exposed to a flow;
a movable second clamping arm; and
an extensive wind deflecting means arranged between the first clamping arm and the second clamping arm,
wherein at least one of the second clamping arm and the wind deflecting means at least nearly abuts against an edge of the overflowable opening in the operating position, and wherein a clamping device is formed in at least one of the first clamping arm and the second clamping arm, and the wind deflecting means is adjustable by setting the distance between the first clamping arm and the second clamping arm.

10. The wind deflector according to claim 1, wherein the wind deflecting means is at least partially air-permeable.

11. The wind deflector according to claim 10, wherein the wind deflecting means is mesh.

12. The wind deflector according to claim 1, wherein the wind deflector means is manually or automatically movable into the operating position.

13. A motor vehicle, comprising:
a wall element having an overflowable opening;
a wind deflector that is movable relative to the overflowable opening from a basic position exposed at least nearly to no flow into an operating position exposed to a flow, the wind deflector including:
a movable first clamping arm that protrudes over the wall element in the operating position exposed to a flow;
a movable second clamping arm; and
an extensive wind deflecting means arranged between the first clamping arm and the second clamping arm, the wind deflecting means being at least partially air-permeable,
wherein at least one of the second clamping arm and the wind deflecting means abuts against an edge of the overflowable opening in the operating position, and
wherein at least a side of the second clamping arm facing the edge further comprises an elastic sealing material, with which the second clamping arm abuts against the edge in the operating position.

14. The motor vehicle according to claim 13, wherein at least one of the edge of the overflowable opening, the first clamping arm and the second clamping arm run transverse or inclined relative to the longitudinal direction of the motor vehicle.

15. The motor vehicle according to claim 13, wherein the first clamping arm moves out of the opening of the wall element when the wind deflector moves from the basic position into the operating position.

16. The motor vehicle according to claim 13, wherein the least one at least partially air-permeable section wind deflecting means is mesh.

* * * * *